May 5, 1964 A. ALFORD 3,132,313
IMPEDANCE MATCHING FILTER
Filed Aug. 13, 1959

INVENTOR.
ANDREW ALFORD
BY Ezekiel Wolf, Wolf & Greenfield
ATTORNEYS 3,132,313

IMPEDANCE MATCHING FILTER

Andrew Alford, Winchester, Mass.
(299 Atlantic Ave., Boston 10, Mass.)

Filed Aug. 13, 1959, Ser. No. 833,508
16 Claims. (Cl. 333—32)

The present invention relates in general to matching of transmission line impedances with filters and more particularly concerns a novel high frequency impedance matching system capable of effecting an exceptionally high degree of impedance match between a source impedance and a load impedance over a wide range of frequencies. By cascading a number of circuits arranged according to the invention, the energy reflected back to the source may be reduced to a very low value, even when one impedance differs substantially from that of the other.

It has been discovered that lumped parameter filters formed of reactive elements may be adapted to match slightly mismatched impedances so as to reduce the VSWR in an associated transmission line to as close to unity as measuring equipment will usually indicate. This result is obtained over an exceptionally wide frequency range.

It is contemplated as an important object of the present invention to provide a wide-band impedance matching network.

It is another object of the invention to provide a wide-band impedance matching network which may be constructed with standard lumped parameter circuit elements.

Still another object of the invention is to provide a wide-band impedance matching network in accordance with the preceding objects which may be cascaded with other like networks to effect an exceptionally high degree of match between input and output impedances of considerably different values.

Still another object of the invention is to provide a novel method incorporating impedance matching networks in accordance with the preceding objects to facilitate rapidly obtaining the desired impedance match.

According to the invention, the above results are obtained by using networks formed of reactive lumped parameter elements, the relationship of the parameter values being selected in accordance with novel techniques set forth in detail below with respect to the value of an external impedance connected to the network and the frequency range over which it is desired to obtain the match. There are at least two reactive elements of one type coupled to a third reactance of opposite type, that is to say, the first type of reactive element is characterized by an inductive or positive reactance while the opposite type of element is characterized by capacitive or negative reactance. In terms of susceptance, inductive susceptance is negative susceptance while capacitive susceptance is positive susceptance.

Other features, objects and advantages of the invention will become apparent from the following specification when read in connection with the accompanying drawing in which.

Figure 1:
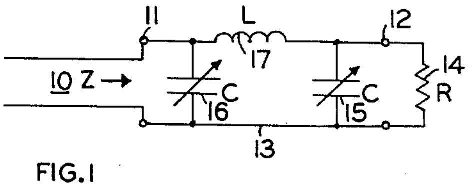
FIG. 1 is a schematic circuit diagram of a preferred embodiment of the invention.

With reference to FIG. 1, there is illustrated a low pass filter arranged according to the invention to provide the desired impedance match. The input and output impedances connected respectively from input terminal 11 and output terminal 12 and jointly to the common terminal or bus line 13 are matched by the network. A load impedance 14 having a resistance R represent the output impedance between output terminal 12 and common terminal 13. An output capacitor 15 is also connected between output terminal 12 and common terminal 13. An input capacitor 16 of nearly the same capacitance C as output capacitor 15 is connected between input terminal 11 and common terminal 13. An inductor 17 of inductance L is connected between input terminal 11 and output terminal 12. A transmission line 10 is terminated between terminals 11 and 13 in the impedance Z presented by the network with the load impedance 14 of resistance R connected between terminal 13 and output terminal 12.

Figure 2:
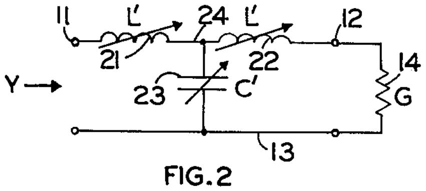
FIG. 2 is the dual of the circuit of FIG. 1 and represents another embodiment of the invention.

Referring to FIG. 2, there is shown the dual of the circuit of FIG. 1. It is known that if it is desired to obtain a driving point admittance having the same characteristics on an admittance basis as the impedance of a known circuit, it is only necessary to make the following changes:

(1) Change each capacitor having a value C in farads to an inductor having the same inductance L′ numerically in henries;

(2) Change each inductance having a value L in henries to a capacitor having the same numerical value C′ in farads;

(3) Change each resistance having a value R in ohms to a conductance having the same numerical value G in mhos;

(4) Change series-connected elements to shunt-connected elements; and, (5) Change shunt-connected elements to series-connected elements.

This is accomplished in the circuit of FIG. 2. Thus, the three-element coupling network consists of serially-connected input and output inductors 21 and 22 respectively connected to terminals 11 and 12, respectively.

A capacitor 23 is connected between the junction 24 of inductors 21 and 22 and the common terminal 13. Load resistance 14 is shown connected between output terminal 12 and common terminal 13. In a practical design situation, the values of the reactive elements may be normalized with respect to the load impedance so that the value for R and G is one. A designer may then use the design criteria set forth below to synthesize two networks and select the one having the more practical values after impedance scaling.

Figure 3:
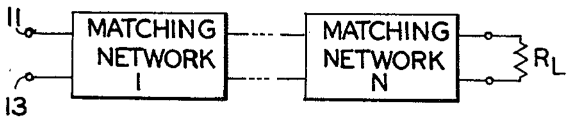
FIG. 3 is a block diagram generally illustrating the techniques for cascading the novel matching networks to effect a higher degree of impedance match.

Referring to FIG. 3, there is shown a system in which networks of the type illustrated in FIG. 1 and FIG. 2 are cascaded to match the load impedance $R_L$ to the source impedance connected across the input terminals to matching network 1.

Figure 4:
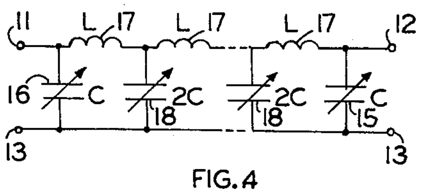
FIG. 4 is a schematic circuit diagram of cascaded sections in which intermediate shunt capacitors are substantially twice as large as the end capacitors; and, FIGS. 5 and 6 show the functional relationship between certain network parameters helpful in understanding the principles of operation of the invention.

Referring to FIG. 4, there is illustrated a schematic circuit diagram of cascaded sections arranged according to the invention. The input capacitor 16 and output capacitor 15 are of very nearly the same value C. The intermediate capacitors 18 are each approximately twice the value of the input and output capacitors.

Having described the physical arrangement of the circuit components, it is appropriate to consider the techniques for selecting parameter values to obtain the results enumerated above. The design criteria may be better developed by considering the reflection coefficient of a transmission line connected at the input between terminals 11 and 13. Since the circuit in FIG. 2 is the dual of the circuit of FIG. 1, the following analysis is applicable to both circuits. However, for simplicity, the development of the theory of operation will be primarily in connection with the circuit of FIG. 1.

The reflection coefficient at the input where line 10 is terminated is given by $$r=\frac{1/Z-1/R}{1/Z+1/R}$$

when the input terminates a transmission line having a characteristic impedance R.

A perfect match occurs when the reflection coefficient goes to zero. This signifies that none of the power delivered to the input is reflected. Since the only non-reactive element is the load resistance 14, this means that all the power delivered to the input between terminals 11 and 13 is absorbed by the load resistance 14.

Since $1/Z$ in the above equation is the driving point admittance seen to the right of line 10, its value may be determined by inspection, recognizing that admittances in parallel and impedances in series add to yield the total admittance and impedance, respectively. It is convenient and customary to substitute the operator $p$ for the $j\omega$ coefficient associated with an inductive or capacitive reactance. Thus, initially designating the values of capacitors 15 and 16 as $C_1$ and $C_2$, respectively, $$1/Z=C_2p+\frac{1+RC_1p}{R+Lp+RC_1p^2}$$

Substituting the right-hand side of this equation for $1/Z$ in the reflection coefficient equation and rationalizing the resulting expression yields the following numerator which must be set equal to zero according to the invention to obtain critical parameter values.

$$RC_2p+LC_2p^2+RC_1LC_2p^3+1+RC_1p-1-Lp/R-LC_1p^2$$

This expression becomes complex upon substituting $j\omega$ for $p$.

$$j\omega RC_2-\omega^2LC_2-j\omega^3RC_1LC_2+1+j\omega RC_1-1-j\omega L/R+\omega^2LC_1$$

This numerator (and the reflection coefficient $r$) is zero only if both the real and imaginary parts are zero. Thus, $$\omega^2L(C_1-C_2)=0$$

for the real part to be zero which establishes the condition that $C_1=C_2=C$. And $$j\omega RC-j\omega^3RLC^2+j\omega RC-j\omega L/R=0$$

for the imaginary part to be zero which establishes the condition $$L/2R=RC/(1+R^2C^2\omega^2)$$

The above relationships were developed on an impedance basis for the circuit of FIG. 1. By substituting L′ for C, C′ for L and G or R, these relationships are applicable to the circuit of FIG. 2. Thus, the relationships, graphically represented in FIGS. 5 and 6 include a set of ordinates and abscissae applicable to the circuit of FIG. 1 nearest the axes and a separate set applicable to the circuit of FIG. 2.

Figure 5:
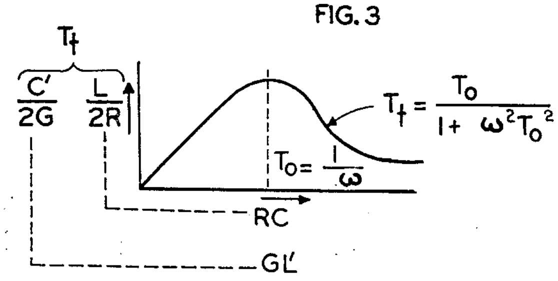

Referring to FIG. 5, the above relationship is graphically represented. It will be observed that the dimensions of both ordinates and abscissae are those of time. It is convenient to refer to the abscissae as the output time constant $T_0$ since this represents the time constant of the parallel combination of resistor 14 and capacitor 15 in the circuit of FIG. 1 and that of output inductor 22 and output resistance 14 in the circuit of FIG. 2. That is, $T_0=RC$ for the circuit of FIG. 1 and GL′ for the circuit of FIG. 2. It is convenient to refer to the ordinates as the transfer time constant $T_t$ since it defines half the time constant formed by the inductance 17 and load resistance 14 in the circuit of FIG. 1 and half the time constant formed by the capacitance 23 and load conductance 14 in the circuit of FIG. 2. That is, $T_t=L/2R$ and $C'/2G$ for the circuits of FIGS. 1 and 2, respectively. Making this substitution in the last-derived relationship yields an equation generally describing both the circuits of FIGS. 1 and 2:

$$T_t=T_0/(1+2\omega^2T_0^2)$$

By differentiating the expression for $T_t$ it can be shown that its maximum occurs for a value of $T_0$ equal to the reciprocal of the radian frequency of applied high frequency energy. For the circuit of FIG. 1 an optimum match at this maximum is obtained only for the single frequency where $$1/C\omega=R=L\omega$$

For any value of L below $R/\omega$ there are two values of RC resulting in zero for the reflection coefficient, one being below $1/\omega$, the other being above. For reasons set forth below, the shorter time constant is preferred. In designing a network in accordance with the inventive concepts, a suitable general procedure is as follows:

(1) For a given terminating load impedance R and desired range of frequencies bounded by an upper limit frequency $f_2$ and lower limit frequency $f_1$, determine the range of capacitance C for capacitors 15 and 16 in order to achieve match over the selected frequency range.

For example, if R is 50 ohms and the upper and lower limit frequencies are 200 and 50 megacycles, respectively, by utilizing the equation $RC=1/\sqrt{2}\omega$, the range of capacitance C is from 45.1 to 11.25 micromicrofarads over the selected range.

(2) Select the maximum value of the inductance L over the range by utilizing the equation $L\omega=R/\sqrt{2}$. For the present example, the maximum value of L is 0.11 to 0.0274 microhenry over the range. While FIG. 1 does not show the inductor 17 as being variable, it may be advantageous at times to make this inductance variable. For practical reasons, it is preferred that this inductance be fixed so that the adjustment of capacitors 15 and 16 alone effects the desired match to be obtained for any frequency within the selected band. Hence, the inductance in this example would be the lower value of .0274 microhenry.

Impedance matching is readily obtained by proceeding in accordance with the following novel techniques. The standard condition is initially established in which the input and output reactances are adjusted to substantially the same value so that the impedance presented between terminals 11 and 13 is substantially equal to the resistance of the load 14. For the circuit of FIG. 1, capacitors 15 and 16 are initially adjusted in this manner, there being a suitable calibrated scale to indicate this initial condition. For the circuit of FIG. 4, the intermediate capacitors 18 are adjusted initially to substantially twice the input and output capacitance. Then, the input capacitor 16 is adjusted until a minimum VSWR is indicated on line 10. This is followed by adjusting the capacitors 18 and output capacitor 16 one-by-one for a minimum VSWR indication until the final adjustment results in a VSWR of essentially unity.

With a single $\pi$ section of the type shown in FIG. 1, a VSWR in line 10 of 1.1 is readily reduced to unity while two such sections in cascade are capable of reducing a VSWR of 1.3 to unity. The VSWR remains substantially unity from a very low frequency to a frequency slightly below the cutoff frequency of the low pass filter formed by the different elements.

The preceding discussion is applicable to the dual network of FIG. 2 with the substitutions indicated above.

Figure 6:
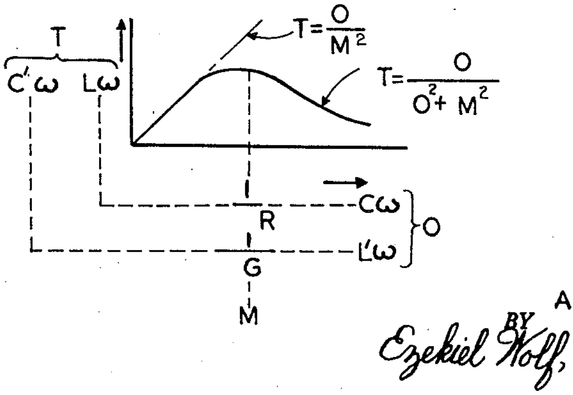

Referring to FIG. 6, there is shown a graphical representation of the functional relationship between the susceptance of each capacitor and the reactance of each inductor helpful in understanding how the wide band operation is obtained. Since impedance and admittance are so closely related it is convenient to define admittance and impedance generically by the term immittance. In FIG. 6, the abscissae are C and L′ for the elements in the circuits of FIGS. 1 and 2, respectively. It is convenient to refer to the immittance of elements 15 and 22 generically as the output immittance O and the immittance of elements 17 and 23 as the transfer immittance T. The value of O where T is a maximum is designated as M and is equal to R and G for the circuits of FIGS. 1 and 2, respectively. It can be shown that $T=O/O^2-M^2$. This equation is derived from the condition derived above that the imaginary component of reflection coefficient must be zero. The coefficient including $\omega$ is set equal to zero and solved for $L\omega$, or T. By differentiating this expression and setting it equal to zero, the indicated values of O for $T=M$ are obtained. The slope at the origin is $1/M^2$. Examination of the curve in FIG. 6 is helpful in understanding the mode of operation of the invention. The curve $T=O/O^2+M^2$ represents the locus of the relationship between reactance and susceptance for matching a transmission line presenting an input impedance of R between terminals 11 and 13 to a load impedance 14 of resistance R. It will be observed that this locus is very nearly a straight line for a wide range of frequencies between D.-C. and the cutoff frequency of the filter. The significance of this relationship is that the impedance presented to the transmission line by the network terminated in a resistance R is this resistance R for the entire frequency range over which this linear relationship holds because the ratio between inductance and capacitance is constant.

It has been discovered that if the impedance of the transmission line connected to the network input deviates slightly from R so that the VSWR in the line is as high as 1.1, the input and output capacitors may be adjusted to reduce the VSWR to unity without appreciably changing the location of the T curve plotted in FIG. 6. As a result, the VSWR remains virtually equal to unity over nearly the entire pass band of the low pass filter formed by the reactive elements. When the VSWR is determined by observing the Smith chart presentation of a commercially available Alford Manufacturing Co. Automatic Impedance Plotter, unity VSWR is indicated when the light spot is positioned at the center of the fluorescent screen. It has been observed that adjusting the output capacitor 15 causes a spot deflection which is substantially at right angles to the spot deflection caused by adjusting input capacitor 16. This facilitates matching since it is only necessary to adjust one capacitor until the spot lies on the deflection arc passing through the center, which arc is followed by the spot as the other capacitor is adjusted.

From an examination of FIG. 6 and applying considerations set forth above, it may be seen that (1) T is less than M.

(2) There are two values of O for any value of T less than M.

(3) Since the critical value of O is at M, when O is less than its value at M, the match obtained is over a relatively broad band. The appropriate relationship between inductance and capacitance in this region is given by the tangent to the curve at the origin. Thus, $T=O/M^2$.

From these considerations, the following design criteria are preferably followed.

Select a T which is less than $1/2M$ at the highest frequency. Choose the maximum value of the variable input and output elements so that at half this value, $T=O/M^2$.

In many practical applications, the value R of the load impedance R is generally known. For example, the customary characteristic impedance of coaxial transmission line carrying microwave energy is 50 ohms so that R is frequently 50 ohms. For the circuit of FIG. 1, the inductance L is chosen so that its impedance at the highest frequency of interest is less than $0.707\times50$, or 35.4 ohms. The input and output capacitors are then selected so that with each set to half its maximum value, the capacitance C of each is given by $C=L/2R^2$.

The principles of this invention are applicable to other networks. For example, high pass filters in the form of a network having shunt inductors and a series capacitance or a T network having series capacitances and a shunt inductance may be employed for impedance matching when the energy coupled has spectral components above cutoff. In addition, the low pass filters may be converted to band pass filters for matching within a prescribed frequency range by substituting series tuned circuits for inductors and shunt tuned circuits for capacitors in accordance with well-known techniques.

There has been described an inexpensive circuit for reliably obtaining a very high degree of impedance match between a source and a load by means of a very simple procedure. It is evident that those skilled in the art may now make numerous modifications of and departures from the specific embodiments described herein without departing from the inventive concepts. Consequently, the invention is to be construed as limited only by the spirit and scope of the appended claims.

What is claimed is:

1. Electrical apparatus for transmitting electrical energy over a prescribed range of frequencies and presenting a first impedance at its input when its output is terminated in a second impedance comprising, a common terminal, a first terminal forming said input with said common terminal, a second terminal forming said output with said common terminal, a transmission line connected to said input and presenting an impedance to said input within a small range of values including the value of said second impedance, said output being terminated in said second impedance, adjustable input and output reactive elements presenting a reactance of one of effective inductive reactance and effective capacitive reactance within said prescribed frequency range connected to said first and second terminals respectively, a transfer reactive element presenting a reactance corresponding to the other of said effective inductive reactance and said effective capacitive reactance within said prescribed frequency range and connected to both said input and output elements, a function of a reactive component of said output reactive element being related to a reactive component of said transfer reactive element within said prescribed frequency range and nonlinearly related thereto outside said frequency range to establish said first impedance at said input, said effective inductive reactance being different from said effective capacitive reactance within said prescribed frequency range, said input and output reactive elements being adjustable to the same value which results in said second impedance being presented at said input within said prescribed frequency range.

2. Electrical apparatus in accordance with claim 1 wherein said reactive elements form a low pass filter with a cutoff frequency above said prescribed range of frequencies.

3. Electrical apparatus in accordance with claim 2 wherein said input and output reactive elements are adjustable capacitors shunting said input and said output respectively, and said transfer element is an inductor in series with said first and second terminals.

4. Electrical apparatus in accordance with claim 2 wherein said input and output reactive elements are adjustable inductors connected in series between said first and second terminals, and said transfer element is a capacitor connected from the junction of said adjustable inductors to said common terminal.

5. Electrical apparatus in accordance with claim 3 and further comprising, at least one other inductor in series with said first-mentioned inductor between said first and second terminals, and an intermediate capacitor connected from each junction between said inductors to said common terminal, the capacity range of each intermediate capacitor being approximately twice the capacity range of each of said input and output capacitors.

6. Electrical apparatus for transmitting electrical energy over a prescribed range of frequencies and presenting a first impedance at its input when its output is terminated in a second impedance comprising, a common terminal, a first terminal forming said input with said common terminal, a second terminal forming said output with said common terminal, a transmission line connected to said input and presenting an impedance to said input within a small range of values including the value of said second impedance, and a plurality of cascaded circuits coupling said input to said output, each of said cascaded circuits comprising, adjustable input and output reactive elements presenting a reactance of the same sense within said prescribed frequency range and connected to a transfer reactive element, said transfer reactive element presenting a reactance of opposite sense to said same sense within said prescribed frequency range, the susceptance of one of said transfer and output elements being linearly related to the reactance of the other of the last-mentioned elements within said prescribed frequency range, the reactance of each of said output elements being different from the reactance of said transfer reactive element within said prescribed frequency range, said input and output elements being adjustable to the same reactance value which results in said second impedance being presented at said input within said prescribed frequency range.

7. An impedance matching network having an input and an output for presenting a first impedance at said input when said output is terminated in a second impedance having a value within a range of values including said first impedance, said first impedance being substantially constant over a predetermined range of frequencies, comprising, nearly equal input and output reactive elements both characterized by the same one of effective inductive reactance and effective capacitive reactance within said frequency range and connected to said input and said output respectively, a transfer reactive element characterized by the other of said effective inductive reactance and said effective capacitive reactance within said frequency range, the reactance of each of said input and output reactive elements being different from the reactance of said transfer element within said predetermined frequency range, a function of a reactive component of said output reactive element being linearly related to a reactive component of said transfer reactive element within said predetermined frequency range to maintain the reflection coefficient at said input substantially zero within said frequency range to a source of said first impedance coupled to said input when said output is terminated in said second impedance over said predetermined frequency range.

8. Apparatus in accordance with claim 7 wherein said transfer element reactive component is less than the immittance of said first and second impedances in corresponding dimensional units within said predetermined frequency range.

9. Apparatus in accordance with claim 8 wherein said input and output reactive elements are inductors and said transfer element is a capacitor.

10. A plurality of apparatus in accordance with claim 9 cascaded.

11. Apparatus in accordance with claim 9 wherein said first impedance is a conductance of value G ohms and the capacitive susceptance of said capacitor is no greater than 0.707G within said predetermined frequency range.

12. A plurality of apparatus in accordance with claim 8 cascaded.

13. Apparatus in accordance with claim 8 wherein the ratio of said first impedance immittance to said transfer element reactive component in corresponding dimensional units is at least $\sqrt{2}$.

14. Apparatus in accordance with claim 7 wherein said input and output reactive element are capacitors and said transfer element is an inductor.

15. A plurality of apparatus in accordance with claim 14 cascaded.

16. Apparatus in accordance with claim 14 wherein said first impedance is resistive of value R ohms and the inductive reactance of said inductor is no greater than 0.707R within said predetermined frequency range.

References Cited in the file of this patent

UNITED STATES PATENTS

| | | |
|---|---|---|
| 2,194,180 | Sabloniere | Mar. 19, 1940 |
| 2,393,785 | Leeds | Jan. 29, 1946 |
| 2,456,800 | Taylor | Dec. 21, 1948 |
| 2,720,627 | Llewellyn | Oct. 11, 1955 |
| 2,957,944 | Monte | Oct. 25, 1960 |

OTHER REFERENCES

Sveritt: Proceedings of the Institute of Radio Engineers, vol. 19, Number 5, May 1931, pages 725–737.